US012623573B2

(12) United States Patent
Kim

(10) Patent No.: US 12,623,573 B2
(45) Date of Patent: May 12, 2026

(54) PUMPING DEVICE FOR VEHICLE SEAT

(71) Applicant: Hyundai Transys Inc., Seosan-si (KR)

(72) Inventor: Won Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/960,005

(22) Filed: Nov. 26, 2024

(65) Prior Publication Data

US 2025/0170927 A1 May 29, 2025

(30) Foreign Application Priority Data

Nov. 27, 2023 (KR) ........................ 10-2023-0167210

(51) Int. Cl.
*B60N 2/16* (2006.01)
*F16D 41/067* (2006.01)
*F16D 41/10* (2006.01)

(52) U.S. Cl.
CPC ............. *B60N 2/168* (2013.01); *B60N 2/165* (2013.01); *B60N 2/167* (2013.01); *B60N 2/1685* (2013.01); *F16D 41/067* (2013.01); *F16D 41/105* (2013.01)

(58) Field of Classification Search
CPC ........ B60N 2/16; B60N 2/1635; B60N 2/165; B60N 2/167; B60N 2/168; B60N 2/1685; B60N 2/938; B60N 2/943; F16D 15/00; F16D 41/066; F16D 41/067; F16D 41/088; F16D 41/10; F16D 41/105; F16D 67/00; F16D 67/02
See application file for complete search history.

(56) References Cited

U.S. PATENT DOCUMENTS

| | | | | |
|---|---|---|---|---|
| 2009/0273218 A1* | 11/2009 | Park | ........................ | B60N 2/168 |
| | | | | 297/284.6 |
| 2017/0253148 A1* | 9/2017 | Chae | ........................ | B60N 2/169 |
| 2019/0047444 A1* | 2/2019 | Sato | ........................ | B60N 2/168 |
| 2019/0193598 A1* | 6/2019 | Kim | ........................ | B60N 2/165 |

FOREIGN PATENT DOCUMENTS

| | | |
|---|---|---|
| JP | 2017-171007 A | 9/2017 |
| JP | 2017-172590 A | 9/2017 |
| KR | 10-2013-0024640 A | 3/2013 |
| KR | 10-1627641 B1 | 6/2016 |

* cited by examiner

*Primary Examiner* — Richard M Lorence
(74) *Attorney, Agent, or Firm* — Bridgeway IP Law Group, PLLC; Jihun Kim

(57) ABSTRACT

A pumping device for a vehicle seat includes a cover configured to be coupled to one surface of a housing, a brake drum assembled in the housing and having a coupling protrusion provided at a center of one surface of the brake drum that is directed toward the cover, a locking plate positioned between the brake drum and the cover and having a through-hole configured to be coupled to the coupling protrusion, the locking plate being configured to implement a locking state in which the through-hole is coupled to the coupling protrusion, or the locking plate being configured to implement an unlocking state in which the through-hole is separated from the coupling protrusion.

9 Claims, 9 Drawing Sheets

PUMPING DEVICE FOR VEHICLE SEAT

CROSS-REFERENCE TO RELATED APPLICATIONS

This application claims priority to and the benefit of Korean Patent Application No. 10-2023-0167210 filed in the Korean Intellectual Property Office on Nov. 27, 2023, the entire contents of which are incorporated herein by reference.

TECHNICAL FIELD

The present invention relates to a pumping device for a vehicle seat.

BACKGROUND ART

In general, a pumping device for a vehicle seat refers to a device configured to enable an occupant seated in a seat to adjust a height of a seat cushion to fit the occupant's body type.

Power of a lever or a drive motor may be transmitted to a link mechanism by means of the pumping device for a vehicle seat, such that the link mechanism may operate. The seat cushion may be raised or lowered by an operation of the link mechanism. Therefore, a height of the seat cushion may be adjusted.

However, when an external force is applied to the pumping device for a vehicle seat, a load, which is generated by unevenness, vibration, or the like while the vehicle travels, is repeatedly transmitted into a housing, which causes a slip of a brake drum.

DOCUMENT OF RELATED ART

Patent Document (Patent Document 1) Korean Patent No. 10-1627641 (published on Jun. 8, 2016)

SUMMARY OF THE INVENTION

The present invention has been made in an effort to solve the above-mentioned problem, and an object of the present invention is to provide a pumping device for a vehicle seat that is capable of applying a separate locking structure and preventing a slip caused by an external force.

In order to achieve the above-mentioned object, the present invention provides a pumping device for a vehicle seat, the pumping device including: a cover configured to be coupled to one surface of a housing; a brake drum assembled in the housing and having a coupling protrusion provided at a center of one surface of the brake drum that is directed toward the cover; a locking plate positioned between the brake drum and the cover and having a through-hole configured to be coupled to the coupling protrusion, the locking plate being configured to implement a locking state in which a rotation of the brake drum is restricted when the through-hole is coupled to the coupling protrusion as guide holes provided around the through-hole move in a state in which the guide holes are coupled to guide protrusions provided on one surface of the cover, or the locking plate being configured to implement an unlocking state in which the through-hole is separated from the coupling protrusion; and an elastic member disposed between the cover and the locking plate and configured to elastically support the locking plate.

In addition, an outer-diameter portion of the coupling protrusion and an inner-diameter portion of the through-hole may each be configured as a concave-convex portion.

In addition, accommodation grooves may each be formed between protruding portions provided along an edge of one surface of the locking plate and each have two opposite surfaces each formed as an inclined surface, protrusions may be provided along an outer-diameter portion of the brake drum, and extension portions provided along an outer-diameter portion of a clutch drum may each be inserted between the protrusions.

In addition, when power is transmitted to the clutch drum, the clutch drum may rotate, ends of the extension portions inserted into the accommodation grooves may move to the protruding portions along the inclined surfaces of the accommodation grooves, the locking plate may be pushed in a direction toward the cover, and the through-hole and the coupling protrusion may be uncoupled, such that the unlocking state may be implemented.

In addition, when no power is transmitted to the clutch drum, the locking plate may be pushed in a direction toward the brake drum by an elastic force of the elastic member, and the through-hole may be coupled to the coupling protrusion, such that the locking state may be implemented.

In addition, rollers may each be positioned between the protrusion and the extension portion.

In addition, power may be transmitted to the clutch drum through a shaft, and the shaft may penetrate the housing and be power-connected to the clutch drum assembled in the housing.

In addition, when the power is transmitted to the clutch drum through the shaft, the extension portions may press the rollers while rotating, such that the brake drum may rotate, and a rotational force of the brake drum may be transmitted to a pinion gear power-connected to the brake drum.

In addition, the rotational force of the pinion gear may be transmitted to a gear of a link engaging with the pinion gear, and a height of a seat cushion may be adjusted by a raising/lowering operation of the link.

In addition, power may be generated by a lever or a drive motor.

According to the present invention, it is possible to apply the separate locking structure and prevent a slip caused by an external force.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
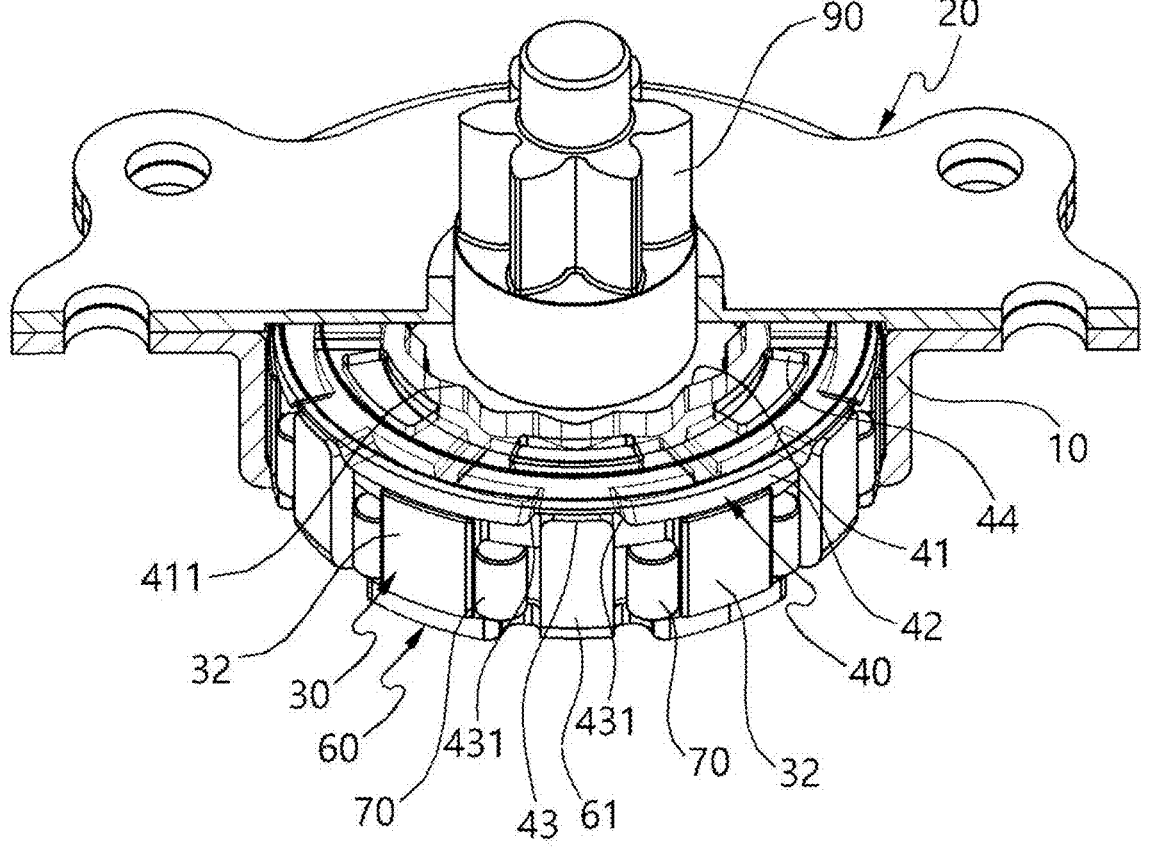
FIG. 1 is a perspective view illustrating a pumping device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
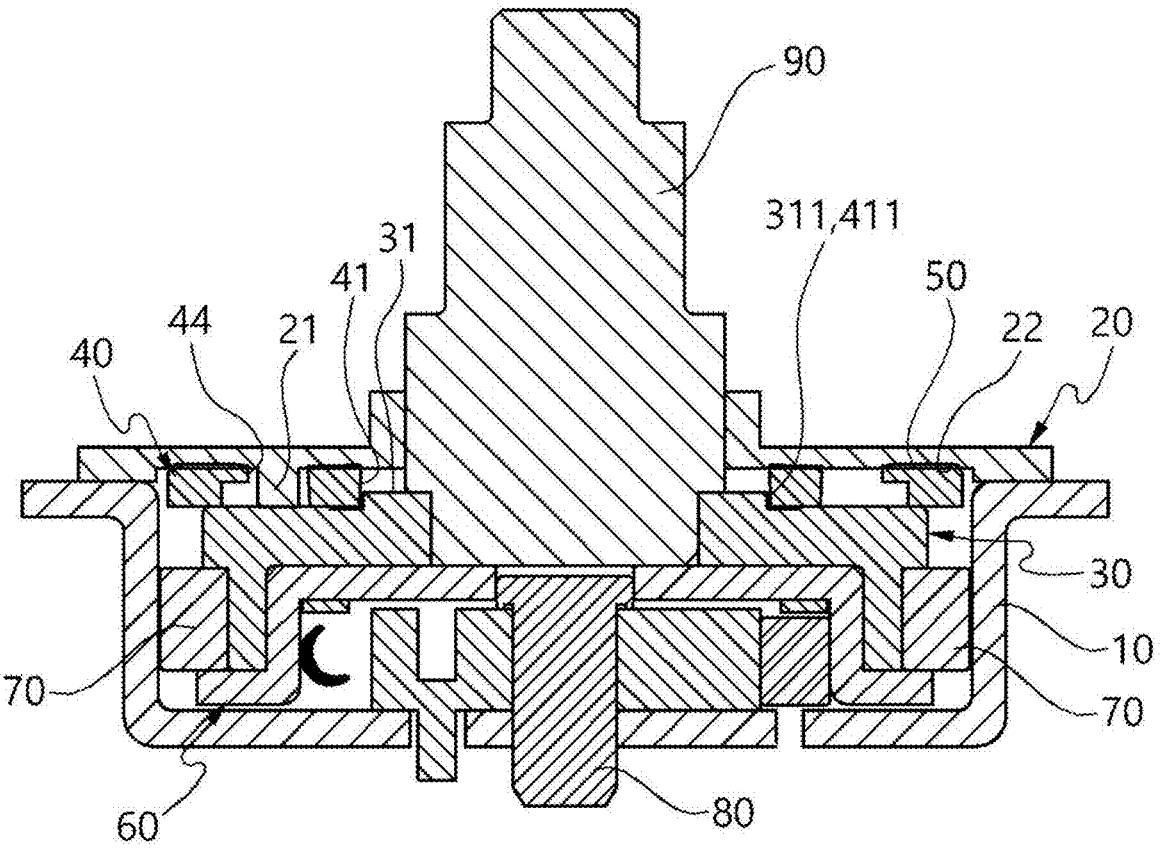
FIG. 2 is a cross-sectional side view illustrating the pumping device for a vehicle seat according to the exemplary embodiment of the present invention.
Figure 3:
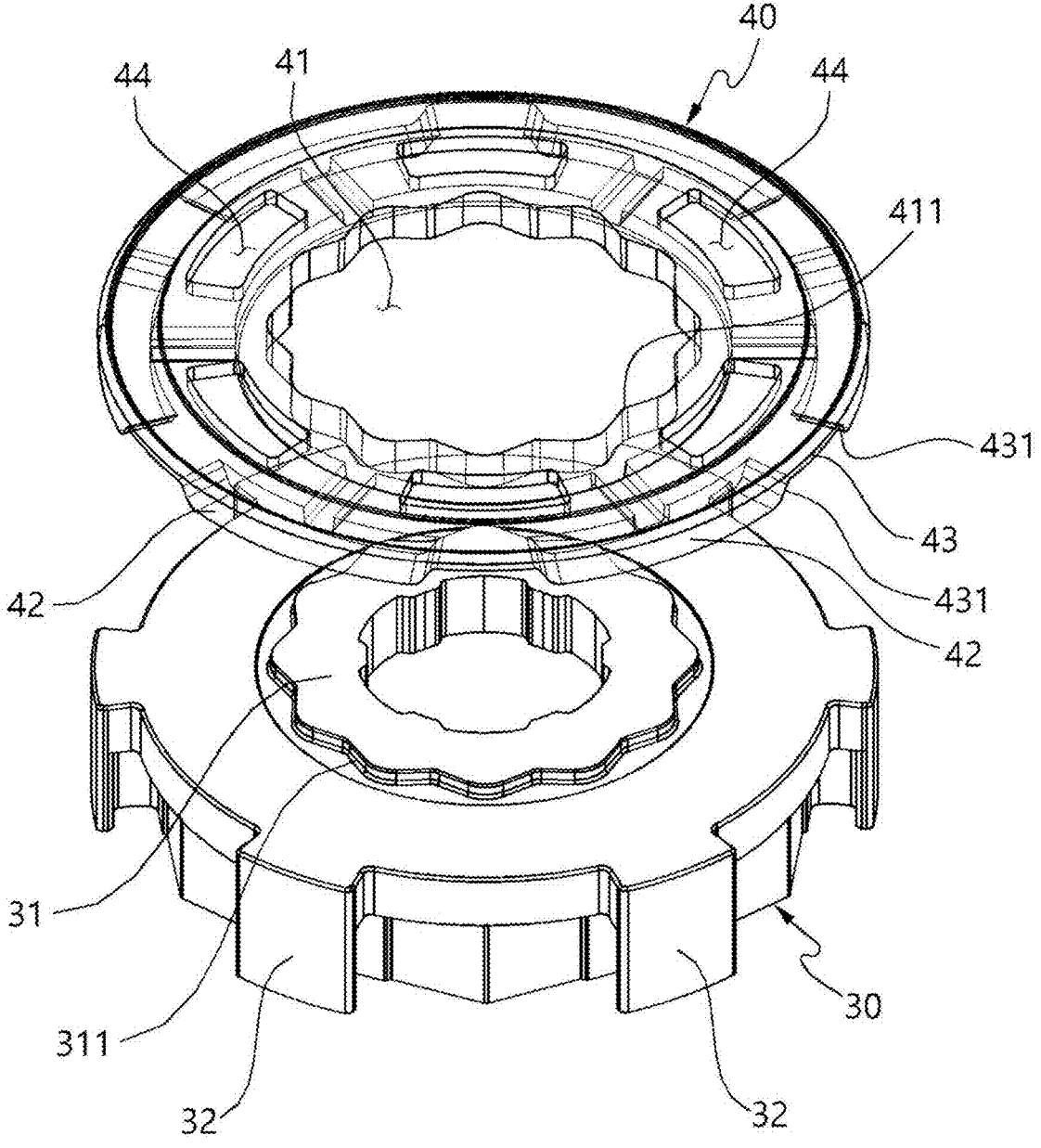
FIG. 3 is an exploded perspective view illustrating a brake drum and a locking plate according to the exemplary embodiment of the present invention.

FIG. 1 is a perspective view illustrating a pumping device for a vehicle seat according to an exemplary embodiment of the present invention, FIG. 2 is a cross-sectional side view illustrating the pumping device for a vehicle seat according to the exemplary embodiment of the present invention, and FIG. 3 is an exploded perspective view illustrating a brake drum and a locking plate according to the exemplary embodiment of the present invention.

As illustrated in FIGS. 1 to 3, a pumping device for a vehicle seat of the present invention may include a cover 20, a brake drum 30, a locking plate 40, and an elastic member 50.

The cover 20 may be coupled to one surface of a housing 10 in a state in which components, such as the brake drum 30, a clutch drum 60, and the locking plate 40, are coupled in the housing 10.

A coupling protrusion 31 may be provided on the brake drum 30. The coupling protrusion 31 may protrude from a center of one surface of the brake drum 30 toward the cover

20. An outer-diameter portion of the coupling protrusion 31 may be configured as a concave-convex portion 311.

The locking plate 40 may be assembled to be positioned between the cover 20 and the brake drum 30. The locking plate 40 may include a through-hole 41, protruding portions 42, accommodation grooves 43, and guide holes 44.

The through-hole 41 may be bored at a center of the locking plate 40. The through-hole 41 may be configured in a shape that conforms to the coupling protrusion 31 so that the through-hole 41 may be coupled to the coupling protrusion 31.

An inner-diameter portion of the through-hole 41 may be configured as a concave-convex portion 411. The concave-convex portion 411 of the through-hole 41 may be configured in a shape that conforms to the concave-convex portion 311 of the coupling protrusion 31.

The guide holes 44 may be provided at predetermined intervals around the through-hole 41. The guide holes 44 may be coupled to guide protrusions 21 provided on one surface of the cover 20.

The locking plate 40 may be coupled to the coupling protrusion 31 of the brake drum 30 as the guide holes 44 move along the guide protrusions 21 in the state in which the guide holes 44 are coupled to the guide protrusions 21, such that a locking state in which a rotation of the brake drum 30 is restricted may be implemented.

The through-hole 41 of the locking plate 40 is separated from the coupling protrusion 31 as the guide holes 44 move along the guide protrusions 21 in the state in which the guide holes 44 are coupled to the guide protrusion 21, such that an unlocking state may be implemented.

The elastic member 50 may be positioned between the cover 20 and the locking plate 40. The elastic member 50 may elastically support the locking plate 40. The locking plate 40 is pushed in a direction toward the brake drum 30 by an elastic force of the elastic member 50, such that the through-hole 41 of the locking plate 40 may be coupled to the coupling protrusion 31 of the brake drum 30.

Figure 4:
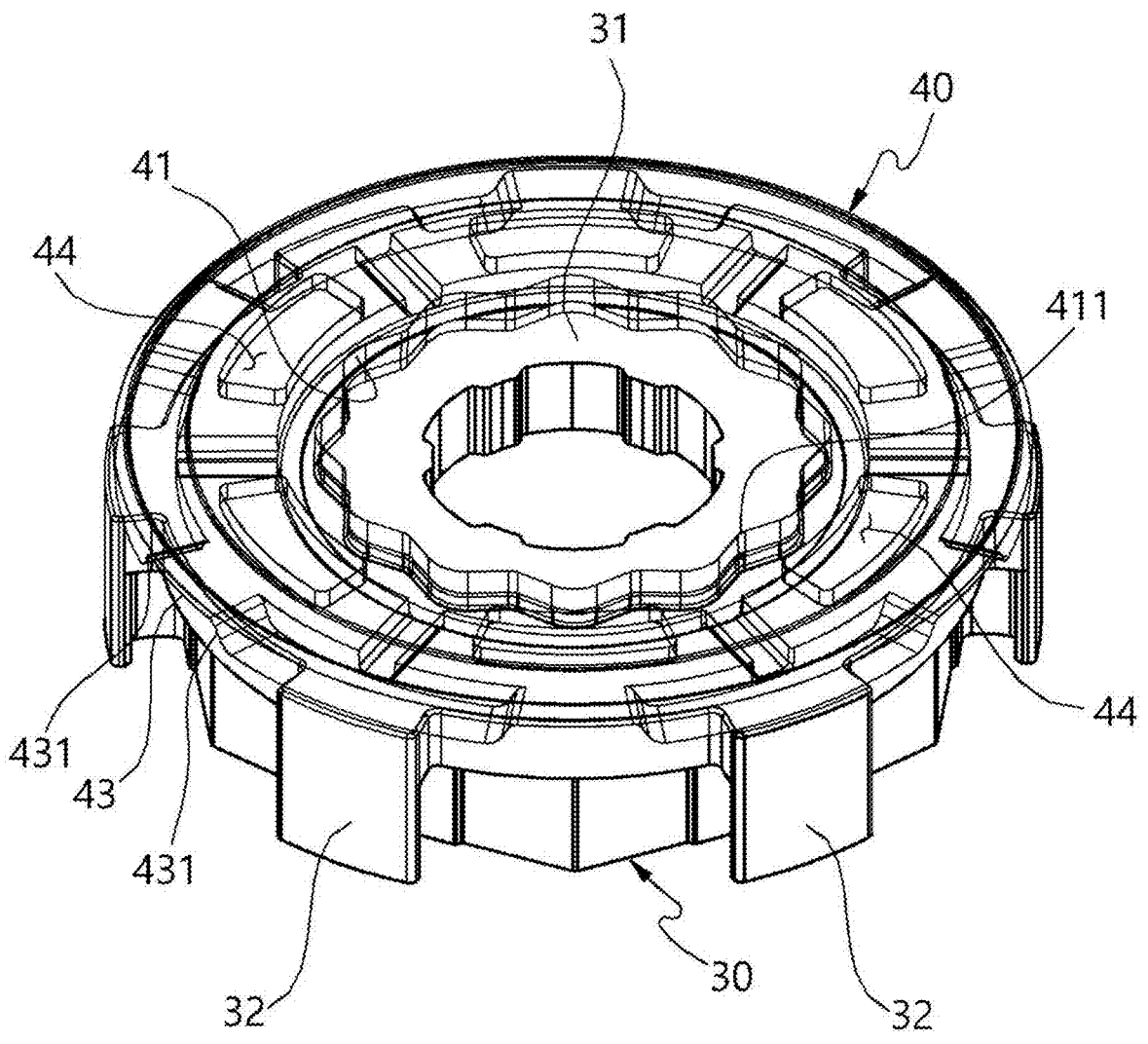
FIG. 4 is a view illustrating a state in which the brake drum and the locking plate according to the exemplary embodiment of the present invention are coupled.
Figure 5:
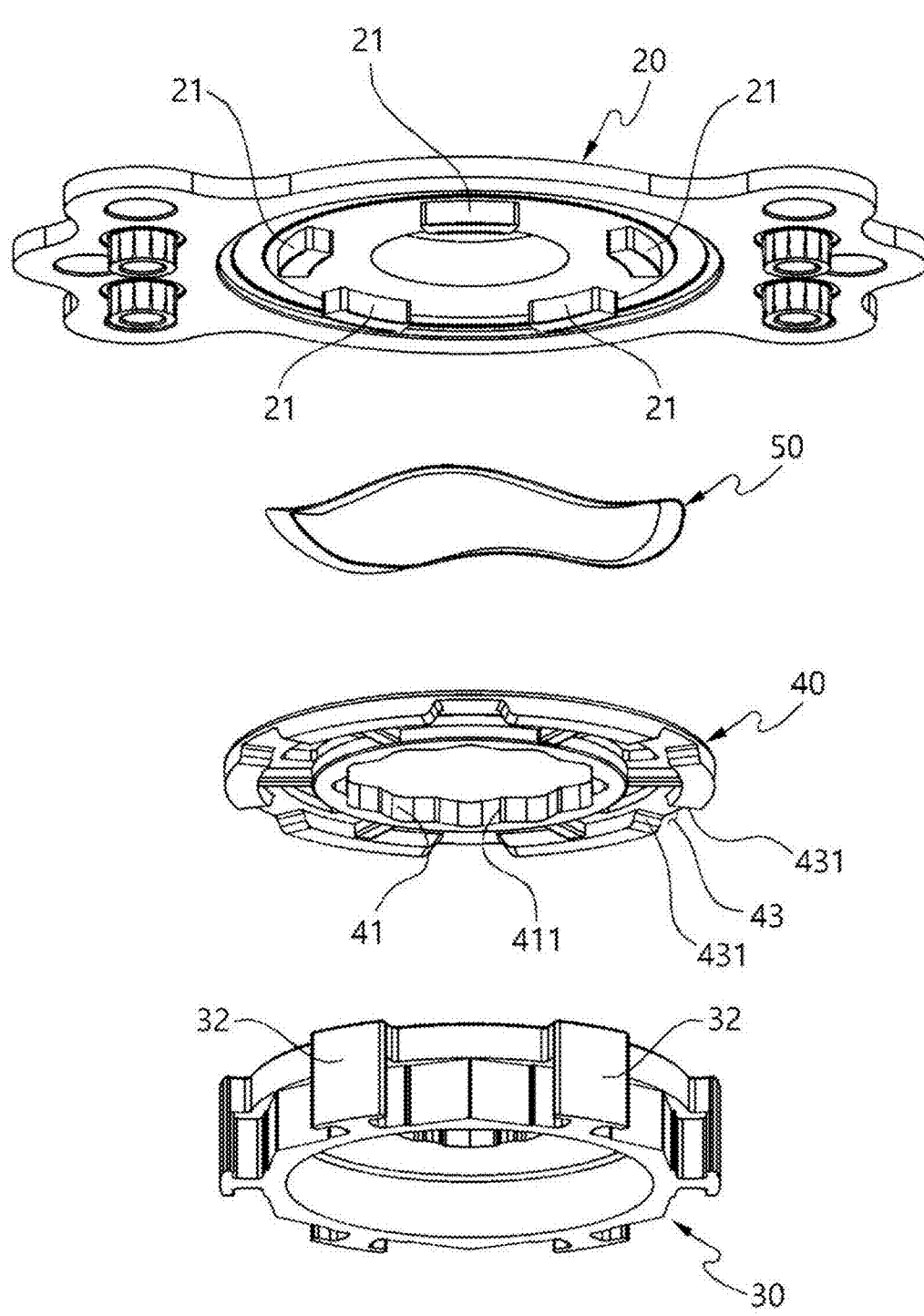
FIG. 5 is a view illustrating the brake drum, the locking plate, an elastic member, and a cover according to the exemplary embodiment of the present invention.

FIG. 4 is a view illustrating a state in which the brake drum and the locking plate according to the exemplary embodiment of the present invention are coupled, and FIG. 5 is a view illustrating the brake drum, the locking plate, the elastic member, and the cover according to the exemplary embodiment of the present invention.

As illustrated in FIGS. 4 and 5, the protruding portions 42 may be provided at predetermined intervals along an edge of one surface of the locking plate 40.

The accommodation groove 43 may be provided between the protruding portions 42. Two opposite surfaces of the accommodation groove 43 may be configured as inclined surfaces 431 each having a width that increases in the direction toward the brake drum 30.

A coupling groove 22 into which the elastic member 50 is inserted may be provided in one surface of the cover 20.

Figure 6A:
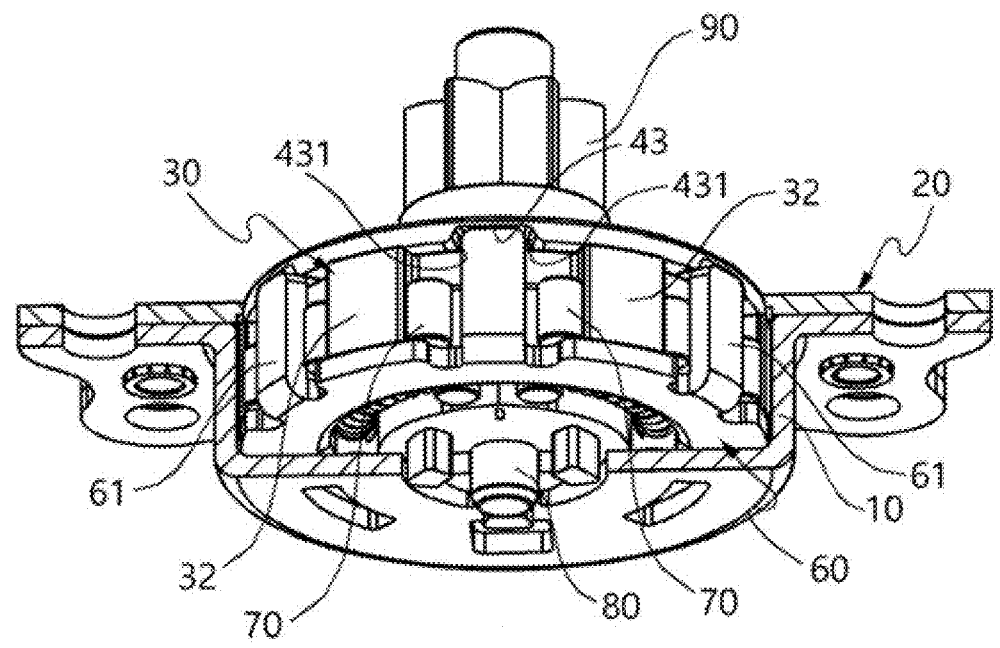
FIG. 6A is a view illustrating a locking operation according to the exemplary embodiment of the present invention.
Figure 6B:
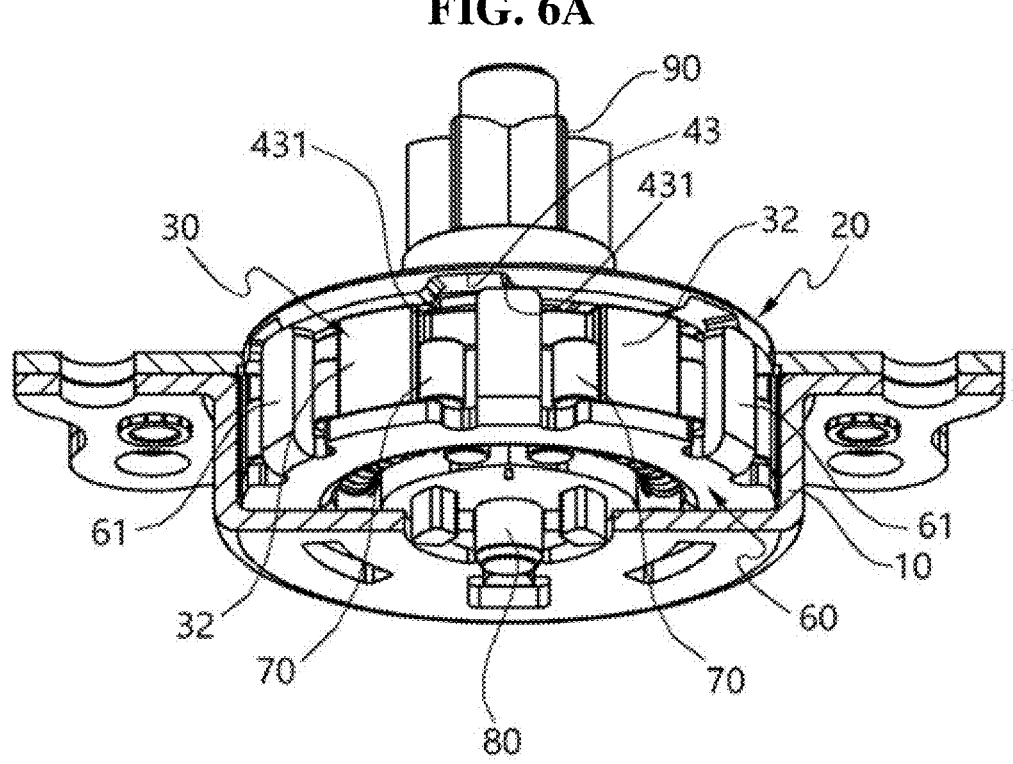
FIG. 6B is a view illustrating an unlocking operation according to the exemplary embodiment of the present invention.

FIG. 6A is a view illustrating a locking operation according to the exemplary embodiment of the present invention. FIG. 6B is a view illustrating an unlocking operation according to the exemplary embodiment of the present invention.

As illustrated in FIGS. 6A and 6B, protrusions 32 may be provided along an outer-diameter portion of the brake drum 30.

Extension portions 61 of the clutch drum 60 may each be inserted between the protrusions 32 of the brake drum 30. The extension portions 61 may be provided along an outer-diameter portion of the clutch drum 60.

When power is transmitted to the clutch drum 60, ends of the extension portions 61, which are positioned in the accommodation grooves 43 of the locking plate 40 as illustrated in FIG. 6A, may be moved to the protruding portions 42 of the locking plate 40 along the inclined surfaces 431 of the accommodation grooves 43 by the rotation of the clutch drum 60 as illustrated in FIG. 6B.

Rollers 70 may each be positioned between the protrusion 32 of the brake drum 30 and the extension portion 61 of the clutch drum 60.

A shaft 80 may penetrate the housing 10 and be power-connected to the clutch drum 60 assembled in the housing 10. Power from a lever (not illustrated), a drive motor (not illustrated), or the like may be transmitted to the clutch drum 60 through the shaft 80.

The clutch drum 60 may rotate as the power is transmitted to the clutch drum 60 through the shaft 80. When the clutch drum 60 rotates, the extension portions 61 may press the rollers 70 while rotating, thereby rotating the brake drum 30.

A rotational force of the brake drum 30 may be transmitted to a pinion gear 90 power-connected to the brake drum 30.

Next, an unlocking operation of the present invention will be described.

Figure 7:
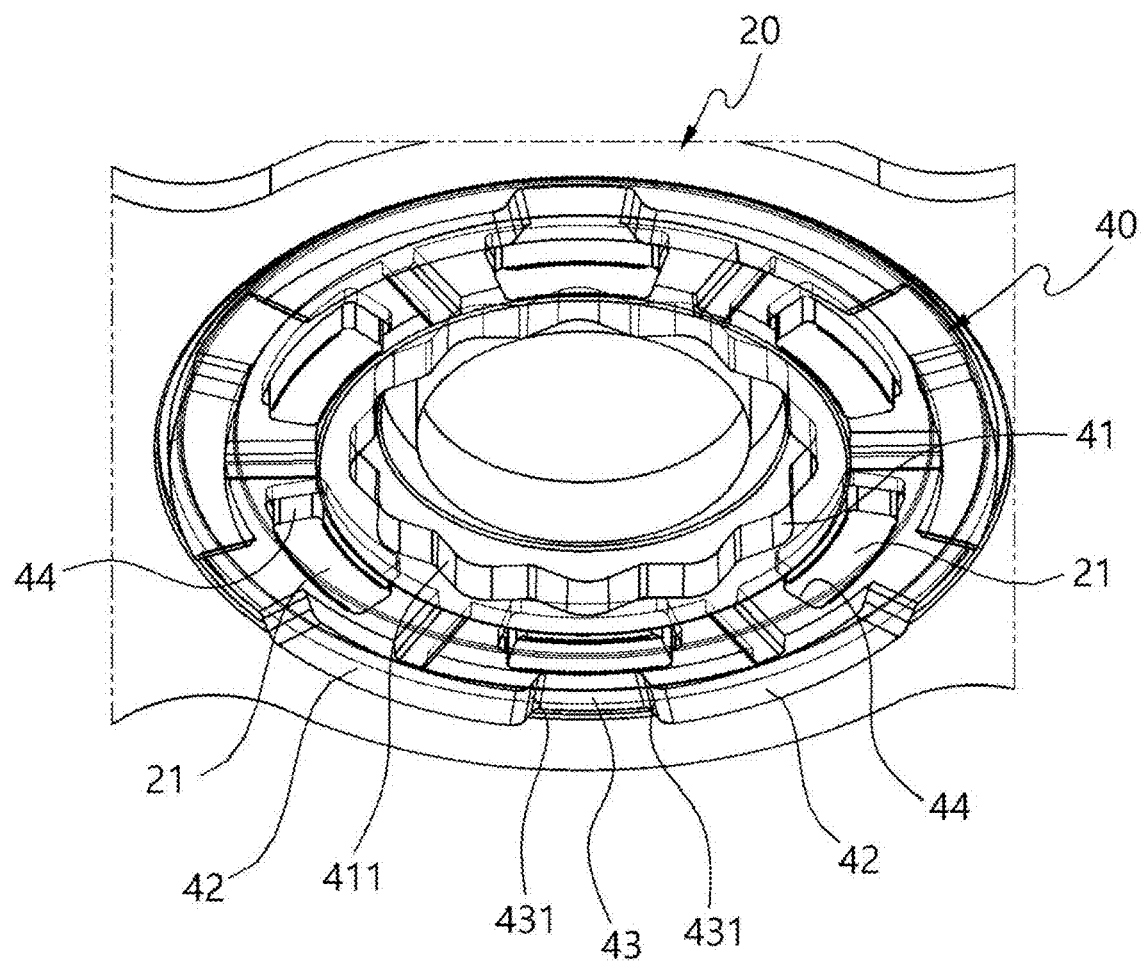
FIG. 7 is a view illustrating a state in which guide holes of the locking plate according to the exemplary embodiment of the present invention are coupled to guide protrusions of the cover.
Figure 8:
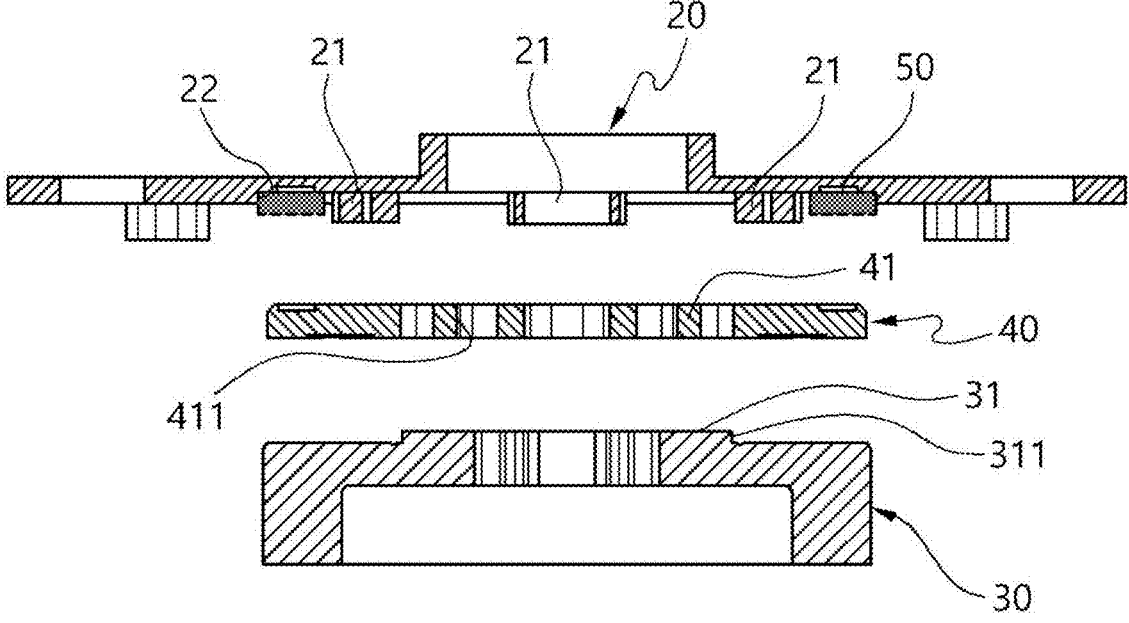
FIG. 8 is a view illustrating a state in which the brake drum, the locking plate, the elastic member, and the cover according to the exemplary embodiment of the present invention are unassembled.

FIG. 7 is a view illustrating a state in which the guide holes of the locking plate according to the exemplary embodiment of the present invention are coupled to the guide protrusions of the cover, and FIG. 8 is a view illustrating a state in which the brake drum, the locking plate, the elastic member, and the cover according to the exemplary embodiment of the present invention are unassembled.

As illustrated in FIGS. 6 to 8, when an occupant manipulates the lever (not illustrated) or pushes an operating switch (not illustrated) of the drive motor (not illustrated), power may be transmitted to the shaft 80.

The power may be transmitted to the clutch drum 60 through the shaft 80, such that the clutch drum 60 may rotate.

When the clutch drum 60 rotates, the ends of the extension portions 61, which are inserted into the accommodation grooves 43 of the locking plate 40, may move to the protruding portions 42 along the inclined surfaces 431 of the accommodation grooves 43 (see FIG. 6).

The ends of the extension portions 61 press the locking plate 40 while moving to the protruding portions 42, such that the locking plate 40 may be pushed in the direction toward the cover 20.

When the locking plate 40 is pushed in the direction toward the cover 20, the through-hole 41 may be separated from the coupling protrusion 31 of the brake drum 30, such that the unlocking state may be implemented.

The elastic member 50 may be pressed and compressed by the locking plate 40 during the process in which the locking plate 40 is pushed in the direction toward the cover 20.

Next, a locking operation of the present invention will be described.

As illustrated in FIG. 6, in case that no power is transmitted to the clutch drum 60, the locking plate 40 is pushed in the direction toward the brake drum 30 by the elastic force of the elastic member 50, and the through-hole 41 is coupled to the coupling protrusion 31 of the brake drum 30, such that the locking state may be implemented. Therefore, it is possible to prevent a slip of the brake drum 30 caused by an external force.

For example, the through-hole 41 of the locking plate 40 is coupled to the coupling protrusion 31 of the brake drum 30, such that the ends of the extension portions 61 of the clutch drum 60 may be inserted into the accommodation grooves 43 of the locking plate 40.

Next, an operation of raising or lowering a seat cushion will be described.

Figure 9:
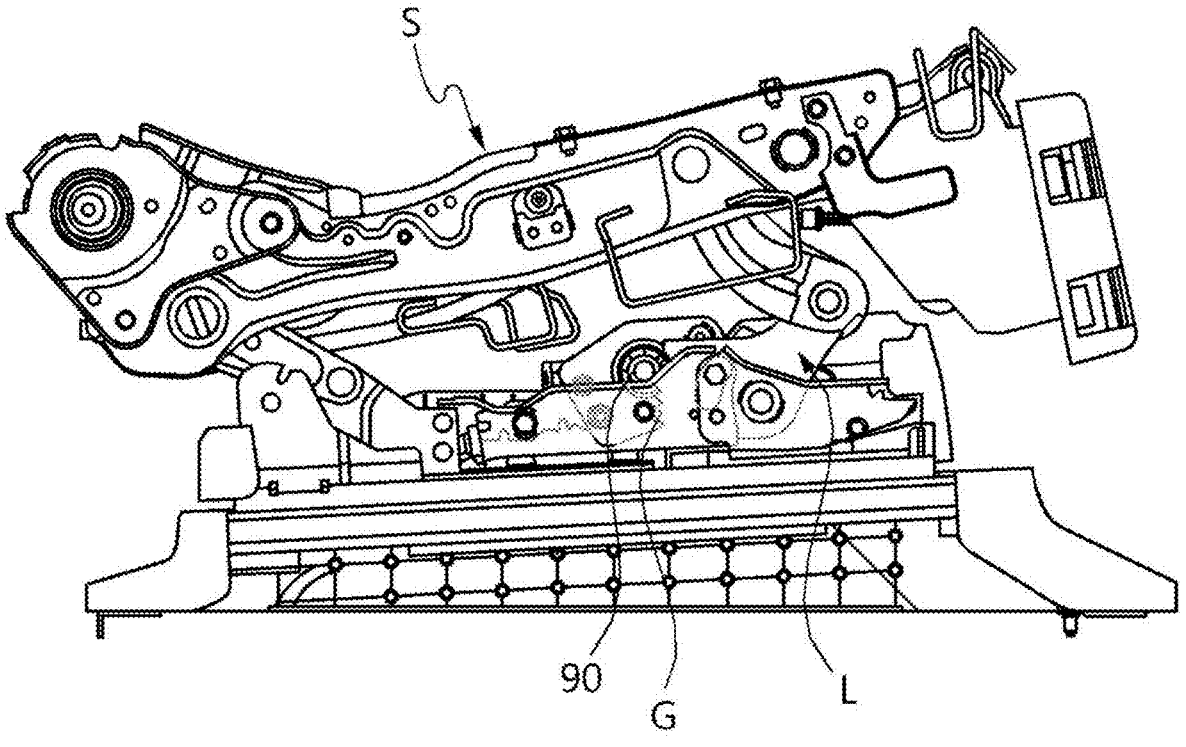
FIG. 9 is a view illustrating a raising/lowering operation of a link according to the exemplary embodiment of the present invention.

FIG. 9 is a view illustrating a raising/lowering operation of a link according to the exemplary embodiment of the present invention.

As illustrated in FIGS. 6 and 9, when power is transmitted to the clutch drum 60 through the shaft 80, the extension portions 61 press the rollers 70 while rotating, such that the brake drum 30 may rotate, and the rotational force of the brake drum 30 may be transmitted to the pinion gear 90 connected to the brake drum 30.

The rotational force of the pinion gear 90 may be transmitted to a gear G of a link L engaging with the pinion gear 90, such that a height of a seat cushion S may be adjusted by the raising/lowering operation of the link L.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pumping device for a vehicle seat, the pumping device comprising:

a cover configured to be coupled to one surface of a housing and having guide protrusions defined on one surface of the cover, a brake drum disposed in the housing and having a coupling protrusion defined at a center of one surface of the brake drum that is directed toward the cover;

a locking plate positioned between the brake drum and the cover and having a through-hole configured to be coupled to the coupling protrusion, the locking plate further having guide holes defined around the through-hole, wherein the locking plate is configured to:

implement a locking state in which a rotation of the brake drum is restricted when the through-hole is coupled to the coupling protrusion as the guide holes defined around the through-hole move in a state in which the guide holes are coupled to the guide protrusions defined on one surface of the cover, or implement an unlocking state in which the through-hole is separated from the coupling protrusion; and an elastic member disposed between the cover and the locking plate and configured to elastically support the locking plate.

2. The pumping device of claim 1, wherein each of an outer-diameter portion of the coupling protrusion and an inner-diameter portion of the through-hole has a concave-convex portion.

3. The pumping device of claim 1, wherein protruding portions are defined along an edge of one surface of the locking plate, wherein accommodation grooves are each defined between the protruding portions, wherein each of the accommodation grooves has two opposite surfaces, each of the two opposite surfaces being defined as an inclined surface, wherein protrusions are defined along an outer-diameter portion of the brake drum, and wherein extension portions defined along an outer-diameter portion of a clutch drum are each inserted between the protrusions defined along the outer-diameter portion of the brake drum.

4. The pumping device of claim 3, wherein when power is transmitted to the clutch drum, the clutch drum is configured to rotate, ends of the extension portions inserted into the accommodation grooves are configured to move to the protruding portions along the inclined surfaces of the accommodation grooves, the locking plate is configured to be pushed in a direction toward the cover, and the through-hole and the coupling protrusion are configured to be uncoupled, such that the unlocking state is implemented.

5. The pumping device of claim 4, wherein when no power is transmitted to the clutch drum, the locking plate is configured to be pushed in a direction toward the brake drum by an elastic force of the elastic member, and the through-hole is configured to be coupled to the coupling protrusion, such that the locking state is implemented.

6. The pumping device of claim 3, wherein the pumping device further comprises rollers, each being positioned between each of the protrusions defined along the outer-diameter portion of the brake drum and each of the extension portions.

7. The pumping device of claim 6, wherein the clutch drum is configured to receive power transmitted through a shaft, and the shaft penetrates the housing and is power-connected to the clutch drum disposed in the housing.

8. The pumping device of claim 7, wherein when the power is transmitted to the clutch drum through the shaft, the extension portions are configured to press the rollers while rotating, such that the brake drum rotates and a rotational force of the brake drum is transmitted to a pinion gear power-connected to the brake drum.

9. The pumping device of claim 8, wherein the pinion gear is configured to transmit the rotational force of the pinion gear to a gear of a link engaging with the pinion gear, and the link is configured to adjust a height of a seat cushion by a raising/lowering operation of the link.

* * * * *